United States Patent

[11] 3,589,825

| [72] | Inventor | Frank A. Wojcik |
| | | 5417 C. 17th St., Indianapolis, Ind. 46218 |
| [21] | Appl. No. | 812,027 |
| [22] | Filed | Apr. 1, 1969 |
| [45] | Patented | June 29, 1971 |

[54] TAP-STARTING GUIDE
5 Claims, 5 Drawing Figs.

[52] U.S. Cl. .................................................. 408/72, 408/241
[51] Int. Cl. ........................................ B23g 5/06, B23g 5/14
[50] Field of Search ........................................ 10/1, 1.5, 141, 147; 77/62, 63, 55 G, 59, 60

[56] References Cited
UNITED STATES PATENTS

| 1,755,255 | 4/1930 | Griffith | 10/147 |
| 2,008,436 | 7/1935 | Cross | 10/147 |
| 2,522,400 | 9/1950 | Polkosnik | 10/147 |
| 2,651,951 | 9/1953 | Altenburger | 77/62 |
| 3,245,678 | 4/1966 | Riehle | 77/62 |

OTHER REFERENCES
AMERICAN MACHINIST, dated Feb. 26, 1948, page 121

*Primary Examiner*—Charles W. Lanham
*Assistant Examiner*—E. M. Combs

ABSTRACT: This invention relates to tap-starting guides. The following improvements are included in the objects. This tap-starting guide is made of tough, hard material in the form of a rectangular block in which most of the cylindrical bores share the same space with other cylindrical bores, so the device is relatively light (one-half pound) and also very compact in size (1¼×1¼×2) with the capacity of containing 12 different sizes of cylindrical bores (0 to three-quarter diameter). The side opposite the side that contains nine cylindrical bores is a mirror image, therefore a left- or right-hand corner or edge-tapping situation is accommodated simply by inverting the tap guide block. For easy and accurate manufacturing of the tap guide block, the intersecting cylindrical bores cross on center, and there is not a minimum to the flat work surface required to permit the use of the tap guide block. During the tap-starting period lubrication of the tap threads is achieved through the access of an intersecting horizontal cylindrical guide bore. After starting a tap the guide can be removed from the work surface without first removing the tap for large sizes or it may remain on the work surface for the full depth of the thread on very small sizes to act as a steady rest.

PATENTED JUN 29 1971 3,589,825

INVENTOR.
BY Frank A. Wojcik

TAP-STARTING GUIDE

This invention relates to precision handtools and more specifically to a device for guiding and ensuring the correct position of a thread cutting or forming tap when starting its operation in a previously formed hole. During the tap-starting period it is best for the tap to be in perfect alignment with the hole in the workpiece. A person starting a tap manually without the aid of a tap-starting guide and without having perfect muscular coordination may cause the tap to wobble as it is started into the hole the result may be imperfectly cut or formed threads and a damaged or broken tap and unnecessary mental and physical strain on the person which will increase the cost and lower the quality of the tapping work.

The rectangular tap-starting guide block is made of one-piece construction and has no moving parts and is very easy to use; the person merely inserts the tap into the corresponding hole in the tap-starting guide so it protrudes through the block and then he places the assembled unit over the previously drilled hole in the workpiece so as to insert the leading edge of the tap into the hole, now the block is either pressed by hand or clamped against the surface of the workpiece then several threads are cut or formed, then the guide block is removed from the partly threaded hole that has been tapped, it will now act as a tap guide by which the full depth of the threads can be tapped with precision. The tap-starting guide makes hand tapping a pleasure instead of a chore; tests have shown that a novice with the aid of a tap-starting guide produced better and quicker work than a man with hand-tapping experience without the aid of a tap-starting guide.

The object of this invention is to provide a rectangular tap-starting guide block that is compact in size, light in weight and that will guide the tap into the hole in the workpiece so accurately the hand-finished threads will be comparable to machine-made threads.

Another object of this invention is to provide a rectangular tap-starting guide block that accommodates the following tap sizes: 0, 2, 3, 4, 5, 6, 8, 10, 12, 1/4 inches, 5/16 inches, 3/8 inches, 7/16 inches, 1/2 inches, 9/16 inches, 5/8 inches, 3/4 inches.

Another object of this invention is to provide a rectangular tap-starting guide block with three lengths of cylindrical bores.

Another object of this invention is to provide a rectangular tap-starting guide block in which the cylindrical bores of some intersecting diameters intersect one another on center.

Another object of this invention is to provide a rectangular tap-starting guide block, with through cylindrical bores, that can be removed without first removing the tap after the tap has been started into the hole far enough to ensure correct alignment.

Another object of this invention is to provide a rectangular tap-starting guide block in which the horizontally related intersecting cylindrical bores can act as ports through which a lubricant may be applied to the thread-cutting portion of the tap.

These and other objects and features of the invention will appear more fully from the accompanying description and drawings and will be clearly pointed out in the claims.

The drawings illustrate the preferred form of construction embodying the invention in which.

Figure 1:
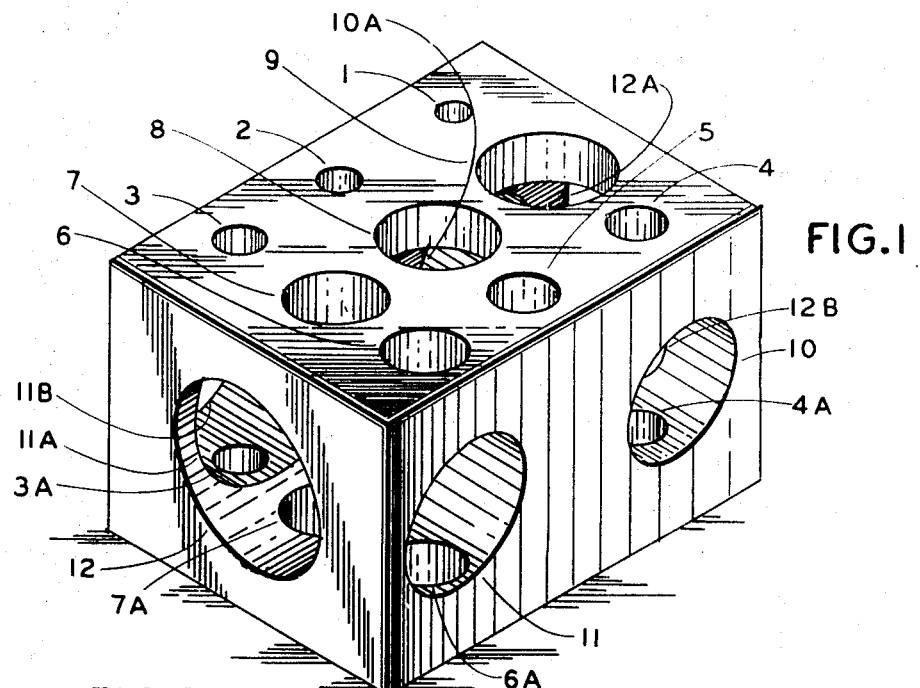
FIG. 1 is a perspective view of the construction.
Figure 2:
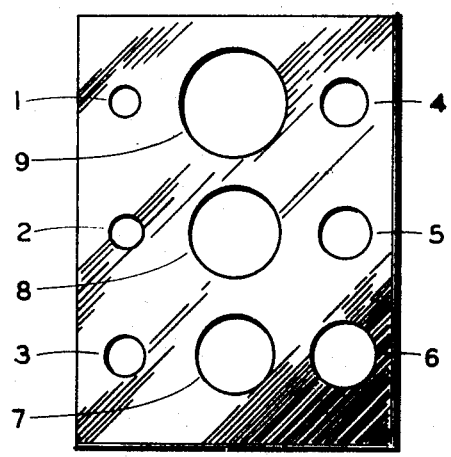
FIG. 2 is a top plan view of the construction shown in FIG. 1.
Figure 5:
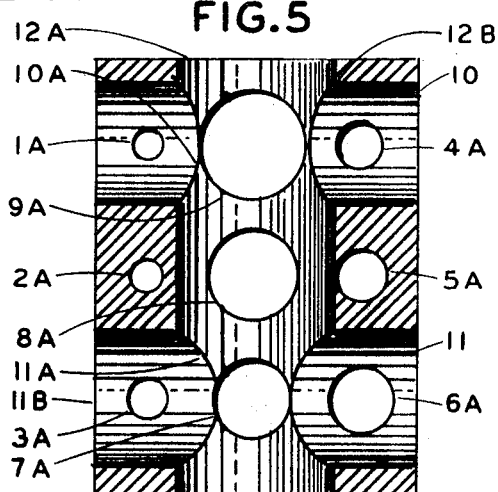
FIG. 5 is a cross section taken on the line 5–5 of the construction shown in FIG. 3.
Figures 3, 4:
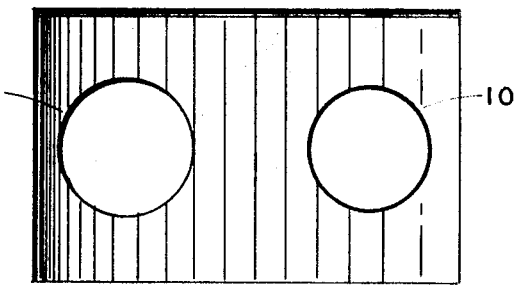
FIG. 3 is an end elevation of the construction shown in FIG. 1.
FIG. 4 is a side elevation of the construction shown in FIG. 1.

A device embodying this invention is in the form of a rectangular block made of any suitable rigid, hard material, it can be made by casting process, preferably of steel, that can be machined and heat treated or it can be made from solid bar stock.

The rectangular block can be made with various cylindrical bore combinations, the preferred example is illustrated. The essential features of the broad construction are that it must present a normal positioning means for the tap to rest upon and position it with respect to a flat workpiece; and that it must present a rectangular block in which most of the cylindrical bores share the same space with other cylindrical bores so the device will have a relatively lightweight and very compact size; and it must present a large number of diameter-pitch tap combinations from the list of Standard Series and selected diameter-pitch combinations unified screw threads. Over 100 nominal sizes can be accommodated; of these approximately 50 are popular sizes and 50 are special sizes, an that it must present three sizes of cylindrical bore lengths to satisfy the length to diameter ratios of three consecutive groups of cylindrical bores machined through three sides of the rectangular block and that it must present the intersecting cylindrical bores as having their axis intersecting other cylindrical bore axis. From the manufacturing standpoint the accuracy of the construction depends on the correct alignment of the intersecting cylindrical bores and that it must present through cylindrical bores; to be practical the block should be removed from the workpiece after the tap has been started sufficiently deep without first necessitating the removal of the tap. A partial feature is the ability to lubricate the threaded part of the tap after it has been started into the workpiece; this is accomplished by using the appropriate intersecting cylindrical bore whose axis at that time is parallel to the base of the block.

In the construction illustrated in FIGS. 1 to 5 the block is of a rectangular shape and is shown in approximately actual size. Three separate intersecting groups of cylindrical bores are incorporated in the block. The first group contains cylindrical bores 1, 2, 3, 4, 5, 6, 7, 8, 9, of different tap size or tap shank diameters extending through the block each with its axis normal to the top and bottom surfaces.

The second group contains two cylindrical bores 10 and 11 of different tap size diameters extending through the block each with its axis normal to the side elevation surface and to the surface opposite the side elevation surface.

The third group contains one cylindrical bore 12 extending through the block with its axis normal to the front elevation surface and to the surface opposite the front elevation surface.

Cylindrical bore 12 intersects and displaces to the extent of its diameter, five cylindrical bores leaving the end sections as 7–7A, 8–8A, 9–9A, 10–10A, 11–11A.

Cylindrical bore 11 intersects and displaces to the extent of its diameter, two cylindrical bores leaving the end sections 6–6A, 3–3A.

Cylindrical bore 10 intersects and displaces to the extent of its diameter, two cylindrical bores leaving the end sections 1–1A, 4–4A.

Cylindrical bore 1 will accommodate the shank of tap sizes 0, 2, 3, 4, 5, 6, bores 2, 3, 4, 5, 6, 7, 8, 9, 10, 11, 12, will accept tap sizes in the following order: 8, 10, 12, 1/4 inches, 5/16 inches, 3/8 inches, 7/16 inches, 9/16 inches, 5/8 inches, 3/4 inches.

Bore 12, the largest cylindrical bore, extends from 12 to 12A, the full length of the block.

Cylindrical bores 10 and 11 extend the full width of the block from 10 to 10A and 11 to 11A.

Cylindrical bores 1, 2, 3, 4, 5, 6, 7, 8, 9, are equal to the height of the block.

The following groups of cylindrical bores have common centerlines: (12, 1–1A, 9–9A, 4–4A, 10–10A,), (12, 8–8A,), (12, 3–3A, 7–7A, 6–6A, 11–11A,). Cylindrical bores (1–1A), (2,3–3A), (4–4A), (5,6–6A), (7–7A), 8–8A), (9–9A), (10–10A), (11–11A), (12) are through type.

When using cylindrical bore 1 for a tap-starting guide 10A may be used as a lubrication port, the following is a list of other tap guide and lubrication port combinations: (3-11), (4-10), (6-11), (7-12), (8-12), (9-12), (10-12), (11-12), (12-11).

FIG. 5, 12A and 12B, 11A and 11B show related location of like numbers in FIG. 1 for clarity.

I claim:

1. A tap-starting guide comprising a solid, one-piece metallic rectangular block having a width, length and height of differing dimensions defining three sets of parallel side surfaces of equal area, and a plurality of spaced, cylindrical bores of differing diameters, said bores extending completely through the block between each set of side surfaces, each bore diameter corresponding to a standard tap size, the axes of said bores being normal to the parallel side surfaces of each set, and the bores of one set of parallel side surfaces are arranged in both intersecting and nonintersecting relationship relative to the bores of each of the other two sets of block surfaces.

2. The guide block of claim 1 wherein the large and intermediate-sized cylindrical bores intersect the small diameter bores at the center of the axes of said small diameter bores.

3. The guide block of claim 1 wherein most of the cylindrical bores are in intersecting relationship with other cylindrical bores and the total volume of the cylindrical bores is greater than the volume of the remaining solid portion of the rectangular block.

4. The guide block of claim 1 wherein the minimum and maximum cylindrical bore diameters correspond to 0-size tap shank diameter and 3/4-inch size tap body diameter respectively.

5. The guide block of claim 1 wherein the cylindrical bore with the largest diameter is parallel to the longest sides of said block, the cylindrical bores with intermediate-sized diameters are parallel to the intermediate length sides, and the cylindrical bores with the smallest diameters are parallel to the shortest sides.

UNITED STATES PATENT OFFICE
CERTIFICATE OF CORRECTION

Patent No. 3,589,825            Dated June 29, 1971

Inventor(s) Frank A. Wojcik

It is certified that error appears in the above-identified patent and that said Letters Patent are hereby corrected as shown below:

On the cover sheet [72] "5417 C. 17th St." should read -- 5417 E. 17th St. --. In the Abstract, line 7, "(1 1/4 x 1 1/4 x 2)" should read -- 1 1/4 x 1 1/2 x 2 --.

Signed and sealed this 22nd day of February 1972.

(SEAL)
Attest:

EDWARD M. FLETCHER, JR.            ROBERT GOTTSCHALK
Attesting Officer            Commissioner of Patents